(12) United States Patent
Jenkins

(10) Patent No.: US 10,450,818 B2
(45) Date of Patent: Oct. 22, 2019

(54) FLUID RELEASE MECHANISM FOR A CHEMICALLY-INFLATABLE BAG

(71) Applicant: STEMLOCK, INCORPORATED, Lee's Summit, MO (US)

(72) Inventor: Thomas S. Jenkins, Lee's Summit, MO (US)

(73) Assignee: STEMLOCK, INCORPORATED, Lee's Summit, MO (US)

( * ) Notice: Subject to any disclaimer, the term of this patent is extended or adjusted under 35 U.S.C. 154(b) by 0 days.

(21) Appl. No.: 15/590,837

(22) Filed: May 9, 2017

(65) Prior Publication Data

US 2017/0241220 A1    Aug. 24, 2017

Related U.S. Application Data

(63) Continuation-in-part of application No. 14/166,074, filed on Jan. 28, 2014, now Pat. No. 9,677,358.

(51) Int. Cl.
*E21B 23/06* (2006.01)
*F42D 1/18* (2006.01)
(Continued)

(52) U.S. Cl.
CPC ........ *E21B 23/065* (2013.01); *B01F 13/0022* (2013.01); *B01J 7/02* (2013.01);
(Continued)

(58) Field of Classification Search
CPC ................. B65D 47/10; B65D 83/687; B65D 51/18–228; B65D 81/32–3294;
(Continued)

(56) References Cited

U.S. PATENT DOCUMENTS 1,585,911 A * 5/1926 Heublein ........... B65D 81/3277
206/219
2,742,202 A * 4/1956 Dresden ................. B65D 47/10
222/541.2
(Continued)

FOREIGN PATENT DOCUMENTS

CL    199301432    11/1994
CL    110802008    1/2009
(Continued)

OTHER PUBLICATIONS

Stemlock Incorporated, Stemlock Gas Bags re Self-Inflating Borehole Plug for Aur Deck Blasting brochure,undated.
(Continued)

*Primary Examiner* — George S Gray
(74) *Attorney, Agent, or Firm* — Shook, Hardy & Bacon LLP

(57) ABSTRACT

The present invention is directed towards an apparatus for providing a nonlabor-intensive process for sealing an opening formed in the ground with a chemically-inflatable bag. The chemically-inflatable bag contains two or more chemical reactants, one of which is a liquid reactant that is initially stored in a liquid-containing device. The liquid-containing device has a removable cap, which upon removal or breakage of the cap permits the liquid reacting agent to contact and react with another reacting agent. The chemical reaction produces carbon dioxide, which expands the chemically-inflatable bag from a collapsed condition to an inflated condition. In the inflated condition, the chemically-inflatable bag fills and protects the integrity of the formed cavity.

13 Claims, 7 Drawing Sheets

(51) Int. Cl.
*F42D 1/16* (2006.01)
*F42D 1/20* (2006.01)
*F42D 1/22* (2006.01)
*B01J 7/02* (2006.01)
*B01F 13/00* (2006.01)
*E21C 37/14* (2006.01)
*F42D 1/08* (2006.01)

(52) U.S. Cl.
CPC ............... *E21C 37/14* (2013.01); *F42D 1/16* (2013.01); *F42D 1/18* (2013.01); *F42D 1/20* (2013.01); *F42D 1/22* (2013.01); *F42D 1/08* (2013.01)

(58) Field of Classification Search
CPC ..... F42D 1/16; F42D 1/22; F42D 1/20; F42D 1/18; E21B 33/134; E21B 33/127; B01J 7/02; B01F 13/0022; A61J 1/2093; A61J 1/2027; A61J 2001/1418; A61J 2001/1425; A61J 2001/1468
USPC .... 53/449, 469, 474; 166/63, 187, 192, 292, 166/300; 206/219, 532; 277/333; 102/333; 156/305
See application file for complete search history.

(56) References Cited

U.S. PATENT DOCUMENTS

| | | | |
|---|---|---|---|
| 2,950,033 A | 8/1960 | Henchert | |
| 3,064,802 A * | 11/1962 | Thurman | B65B 29/10 206/219 |
| 3,635,261 A * | 1/1972 | Morane | B65B 29/10 141/3 |
| 3,777,949 A | 12/1973 | Chiquiari Arias et al. | |
| 4,358,028 A * | 11/1982 | Chiquiar-Arias | A61J 1/067 222/107 |
| 4,402,420 A | 9/1983 | Chernack | |
| 4,630,727 A | 12/1986 | Feriani Mariano et al. | |
| 4,846,278 A | 7/1989 | Robbins | |
| 5,006,004 A | 4/1991 | Dirksing et al. | |
| 5,221,029 A * | 6/1993 | Stull | B62D 3/08 215/253 |
| 6,021,802 A | 2/2000 | Leifels et al. | |
| 6,409,032 B1 * | 6/2002 | Bekkers | A61M 5/30 215/232 |
| 6,619,387 B2 | 9/2003 | Jenkins et al. | |
| 6,722,105 B2 * | 4/2004 | Jenkins | E21B 33/134 53/449 |
| 2003/0047307 A1 * | 3/2003 | Jenkins | E21B 23/065 166/187 |
| 2015/0211325 A1 | 7/2015 | Jenkins | |

FOREIGN PATENT DOCUMENTS

| | | | |
|---|---|---|---|
| DE | 20002609 U1 * | 5/2000 | ........... B65D 1/0238 |
| WO | 2002044045 A1 | 6/2002 | |

OTHER PUBLICATIONS

Stemlock Incorporated, Gas Bags, The Self-Inflating Borehole Plug flyer, undated.
Notice of Allowance dated Feb. 10, 2017, in U.S. Appl. No. 14/166,074, 12 Pages.
Non-Final Office Action dated Dec. 5, 2016 in U.S. Appl. No. 14/166,074, 12 pages.
Non-Final Office Action dated May 17, 2016 in U.S. Appl. No. 14/166,074, 27 pages.
Office Action dated Sep. 17, 2017 in Chilean Patent Application No. 201500203, 8 pages.
International Search Report and Written Opinion dated Jul. 31, 2018 in International Application No. PCT/US18/31869, 9 pages.

* cited by examiner

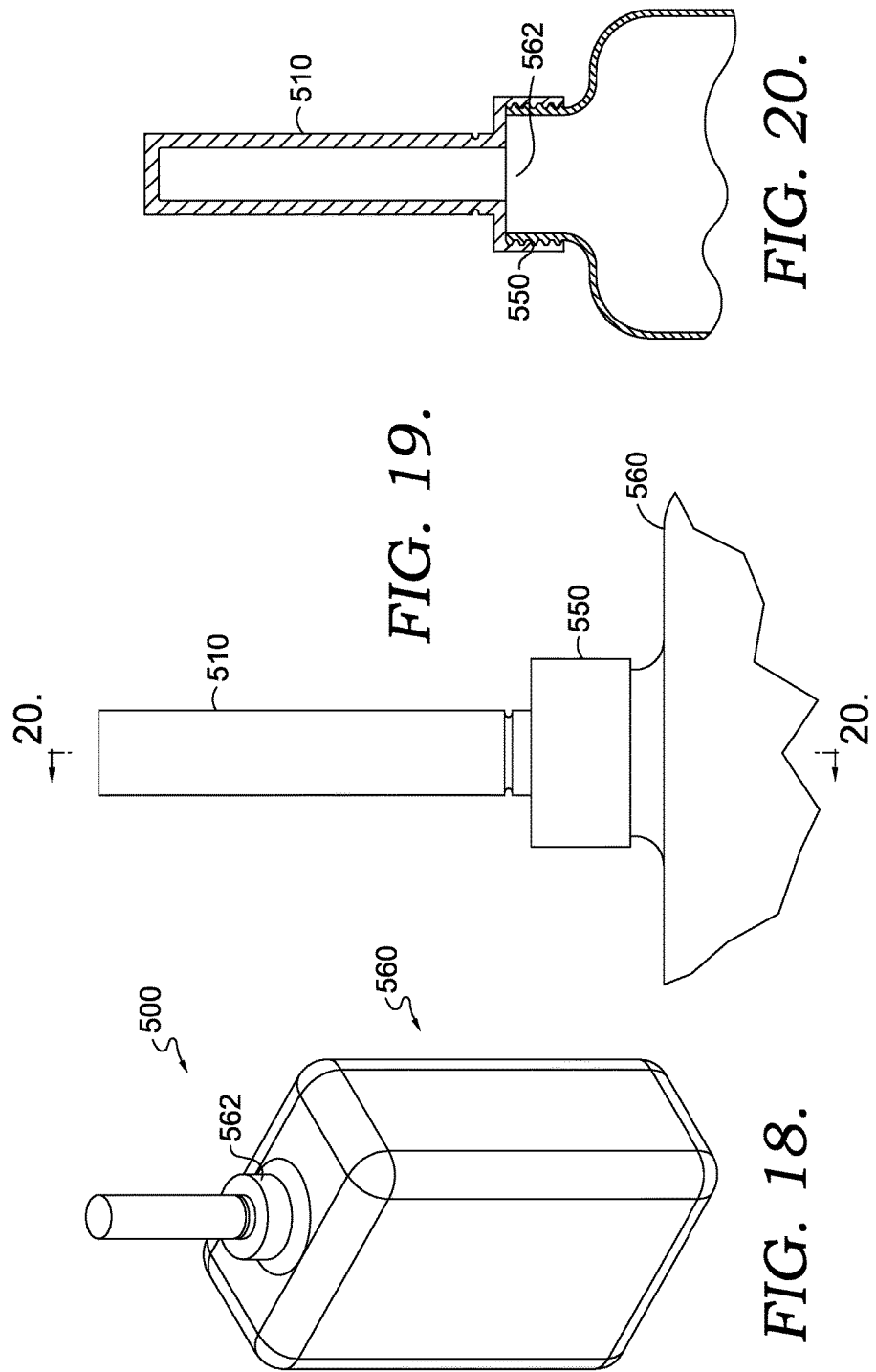

FLUID RELEASE MECHANISM FOR A CHEMICALLY-INFLATABLE BAG

CROSS-REFERENCE TO RELATED APPLICATIONS

This application entitled "FLUID RELEASE MECHANISM FOR A CHEMICALLY-INFLATABLE BAG," is a continuation-in-part application of co-pending U.S. application Ser. No. 14/166,074, filed Jan. 28, 2014, and entitled "FLUID RELEASE MECHANISM FOR A CHEMICALLY-INFLATABLE BAG," the entirety of which is incorporated by reference herein.

STATEMENT REGARDING FEDERALLY SPONSORED RESEARCH OR DEVELOPMENT

Not Applicable.

BACKGROUND OF THE INVENTION

The present invention relates generally to mining and/or drilling operations. More specifically, the present invention relates to improvements in a chemically-inflatable bag for use in sealing an explosive column.

Typically, boreholes are dug and used as explosive columns. Detonation of a typical, full column confined charge produces a single high amplitude stress wave that crushes the borehole wall and moves out into the surrounding rock producing a crack mechanism. In conjunction with the stress wave, high temperature gases assist in extending the crack formation and moving the rock mass of the ground and sublayers.

By incorporating an air gap (air deck) above, below, or within the explosive column, shock wave reflections within the borehole produce a secondary stress wave. This wave extends the crack formation before gas pressurization. The reduced borehole pressure caused by the air column reduces excessive crushing of the rock adjacent to the borehole wall but still is capable of extending the crack formation and moving the rock out away from the opening of the hole. Air deck volumes of up to about 50% can be used before there is any reduction in fragmentation. By using an air deck, smaller amounts of explosives may be used without much change in fragmentation.

Self-inflating plugs are used to seal boreholes at various depths. A problem with self-inflating plugs currently available is that precise amounts of acid are not used, thus causing variations in performance. In some cases, vinegar is used as the acid, and the concentration of acid in the vinegar is not always consistent. Still another disadvantage with currently available self-inflating plugs is that they are folded such that the folds sometimes prevent them from fully inflating and expanding.

Yet another disadvantage with currently available self-inflating plugs is the way in which the reacting agents are released, causing the self-inflating plugs to inflate. In prior art self-inflating plugs, often an unfurling action is necessary to create a moment of inertia to the bag or other compromising action to the bag is necessary to initiate a reaction between a first reacting agent (powder) and a second reacting agent (liquid). Consequently, a chemical reaction is invoked by introducing the displaced portion of the second reacting agent to the first reacting agent, where a by-product of the chemical reaction is a gas, often $CO_2$. As such, the self-inflating plug expands to an inflated condition by way of the gas being generated by the chemical reaction. It is these such actions that have resulted in difficulties inflating the self-inflating plugs. In other prior art self-inflating plugs, in order to initiate the reaction, it is necessary to break the liquid containing device by stepping or stomping on the self-inflating plug. However, this stepping or stomping action has been known to damage self-inflating plugs.

In order to overcome these disadvantages, an improved self-inflating plug is provided. This self-inflating plug, or chemically-inflatable bag, is able to more easily inflate to fit within a borehole.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Generally, an exemplary embodiment of the present invention relates to a chemically-inflatable bag that may be deployed manually by a user to serve, in instances, as an obstruction within a hole in the ground or in any other formed cavity in any environment.

In an embodiment of the present invention, a cap for sealing an opening of a fluid-containing device contained within a chemically-inflatable bag is disclosed. The cap comprises an attachment means for removably securing the cap to the fluid-containing device and a tip portion extending from the attachment means. The tip portion has a tip length sufficient in size such that the tip length is breakable. Upon a breaking of the tip length, fluid from within the fluid-containing device exits into the chemically-inflatable bag and mixes with a reacting agent, also contained in the chemically-inflatable bag, producing a gas that inflates the bag.

In an alternate embodiment of the present invention, a removable cap for use in sealing an opening of a fluid-containing device of a chemically-inflatable bag is disclosed. The removable cap comprises a generally collar-shaped member that slides about an opening of the fluid-containing device. The collar-shaped member has an inner wall, an opposing outer wall, and a recess formed within the inner wall. The collar-shaped member also has a first face and an opposing second face with a backplate secured to the second face such that the cap slides about an opening of the fluid-containing device and the backplate closes off the opening of the fluid-containing device.

In yet another embodiment of the present invention, a chemically-inflatable bag for use as a borehole plug is disclosed. The chemically-inflatable bag comprises a first reacting agent contained therein, and a fluid-containing device also positioned within the chemically-inflatable bag, where the fluid-containing device contains a second reacting agent. The fluid-containing device has an opening and a removable cap secured to the opening such that upon application of a force to the cap, fluid is permitted to flow through the opening of the fluid containing device and contact the first reacting agent causing the chemically-inflatable bag to inflate. The first reacting agent may be loose within the chemically-inflatable bag or contained within a water soluble bag.

Typically, as discussed above, the chemically-inflatable bag is used to fill a drilled hole to prevent backfill or to protect it from erosion by causing the chemically-inflatable bag to expand from a collapsed condition to an inflated condition. In one instance, causing the chemically-inflatable bag to expand includes manually grasping the chemically-inflatable bag and generating a force on the fluid-containing device by applying a force to the removable cap portion. The application of such a force causes the release of the fluid from the fluid-containing device. During this displacement, the second reacting agent (e.g,. liquid substance) is introduced into the chemically-inflatable bag and to the first reacting agent (e.g., solid or powdered substance). This introduction of the first and second reacting agents, and subsequent intermixing, invokes a chemical reaction that produces a quantity of gas capable of expanding the chemically-inflatable bag to an inflated condition.

In one instance, the first and second reacting agents may be several types of chemical agents including, but not limited to, a sodium bicarbonate and an acid, such as vinegar. Further, the expansion may be assisted by an inflation device, such as an aerosol can or any other typical acid-based reaction. In the instance above, combining the first and second reacting agents initiates a chemical reaction that generates a byproduct of carbon dioxide. Generally, the first and second reacting agents are premeasured such that the chemical reaction generates sufficient amounts of carbon dioxide to fully expand the chemically-inflatable bag to the inflated condition. When expanded to the inflated condition, an outer surface of the chemically-inflatable bag contacts walls of the formed cavity and frictionally fix the chemically-inflatable bag thereto. Thus, the chemically-inflatable bag acts as an obstruction to solids or liquids entering the formed cavity and to erosion of walls of the formed cavity.

Additional objects, advantages, and novel features of the invention will be set forth in the description that follows and in part will become apparent to those skilled in the art upon examination of the following, or may be learned by practice of the invention.

BRIEF DESCRIPTION OF THE DRAWINGS

Illustrative embodiments of the present invention are described in detail below with reference to the attached drawing figures, which are incorporated by reference herein. In the accompanying drawings, which form a part of the specification and which are to be read in conjunction therewith, and in which like reference numerals are used to indicate like parts in the various views:

FIG. 18 is a perspective view of a fluid-containing device incorporating the cap of FIGS. 15-17 in accordance with an embodiment of the present invention;

FIG. 19 is a side elevation view of a portion of the fluid-containing device of FIG. 18 in accordance with an embodiment of the present invention; and FIG. 20 is a cross section view of a portion of the fluid-containing device of FIG. 19 in accordance with an embodiment of the present invention.

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or varying components/materials similar to the ones described in this document, in conjunction with other present or future technologies.

Embodiments of the present invention provide an apparatus for facilitating a non-labor intensive and novel process for inflating a self-inflating plug, also known as a chemically-inflatable bag, used to prevent backfill entering, or environmental factors eroding walls of a cavity formed in the ground. Generally, embodiments of the present invention relate to embodiments of a cap for a fluid-containing device that is contained within a chemically-inflatable bag.

Figure 1:
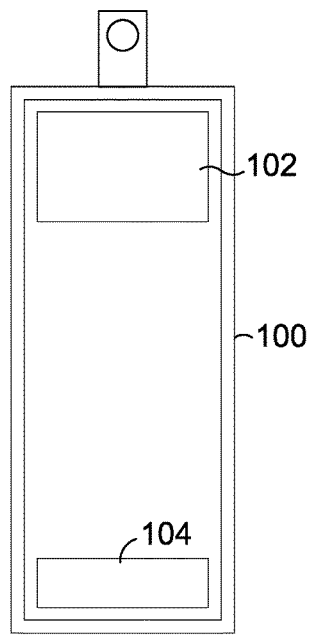
FIG. 1 is a cross section view of a chemically-inflatable bag in accordance with embodiment of the prior art.
Figure 2:
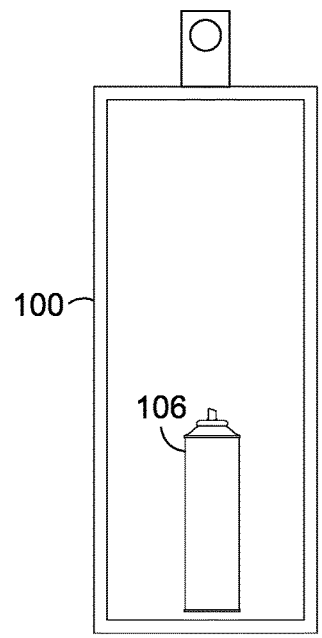
FIG. 2 is a cross section view of a chemically-inflatable bag in accordance with an alternate embodiment of the prior art.
Figure 3:
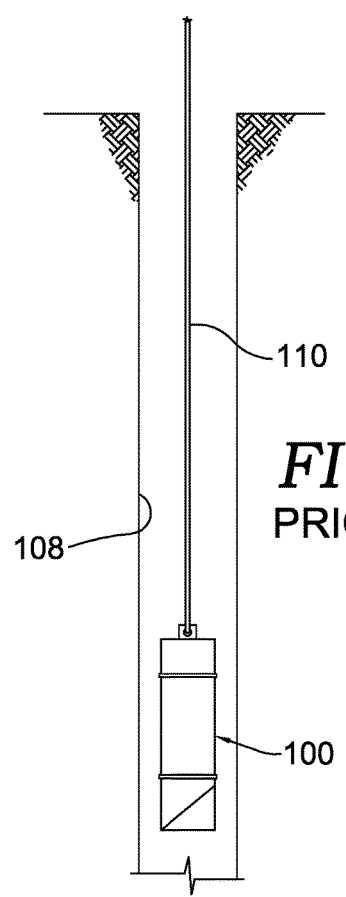
FIG. 3 is a cross section view of a borehole and a chemically-inflatable bag in accordance with an embodiment of the prior art.

Referring back to FIGS. 1-3, a self-inflating plug 100 of the prior art is shown. The self-inflating plug 100 is a folded nylon bag having a high density polyethylene (HDPE) bag 102 that contains an acid and a polyvinyl alcohol (PVA) water soluble bag 104 that contains sodium bicarbonate. The acid mixes with the sodium bicarbonate upon the breaking or leaking of the acid from the HDPE bag 102. FIG. 2 depicts the self-inflating plug 100 incorporating an aerosol device 106 for use in inflating the self-inflating plug. As discussed above, the self-inflating plug 100 can be used to secure an opening, such as a borehole plug, as depicted in FIG. 3. The self-inflating plug 100 is dropped into a borehole 108 by a rope or cord 110, where it inflates to seal the borehole 108. However, as discussed above, the means by which the acid mixes with the sodium bicarbonate in the self-inflating plug 100 was previously inconsistent and unreliable, which prevented complete inflation of the self-inflating plug.

Improvements to the means by which the acid can mix with the sodium bicarbonate is addressed by the improvements provided in the present invention discussed below and depicted in FIGS. 4-20. More specifically with reference to FIGS. 4-6, a cap 200 for sealing an opening of a fluid-containing device contained within a chemically-inflatable bag is disclosed. The cap 200 comprises an attachment means 202 for removably securing the cap 200 to the fluid-containing device (not depicted). An example of a fluid-containing device is depicted in FIGS. 7-9 and will be discussed in more detail below.

Figure 4:
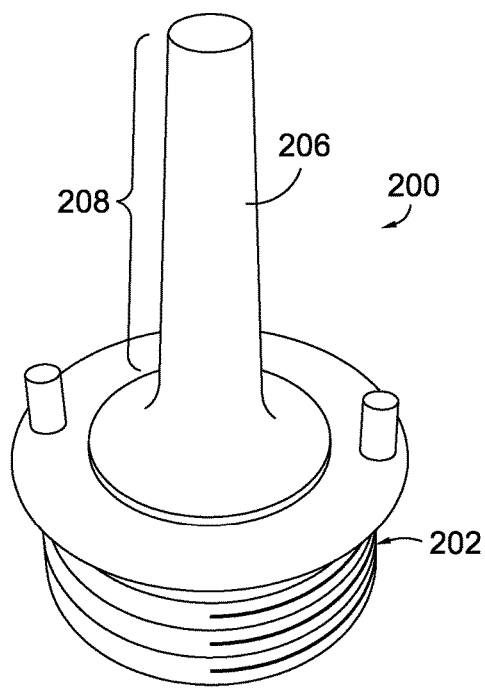
FIG. 4 is a perspective view of a cap for a fluid-containing device in accordance with an embodiment of the present invention.
Figure 5:
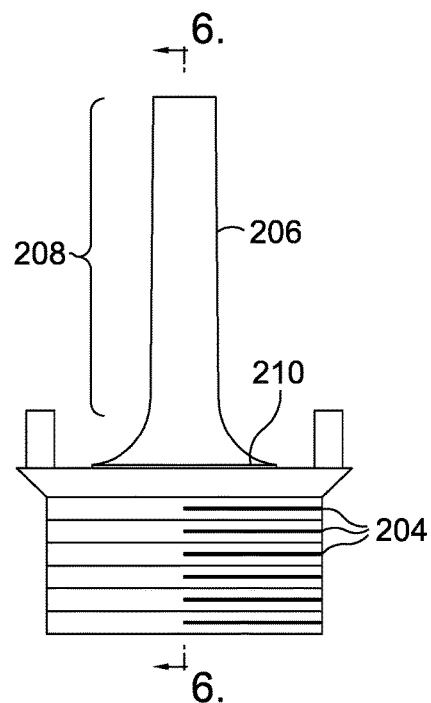
FIG. 5 is a side elevation view of the cap of FIG. 4 in accordance with an embodiment of the present invention.
Figure 6:
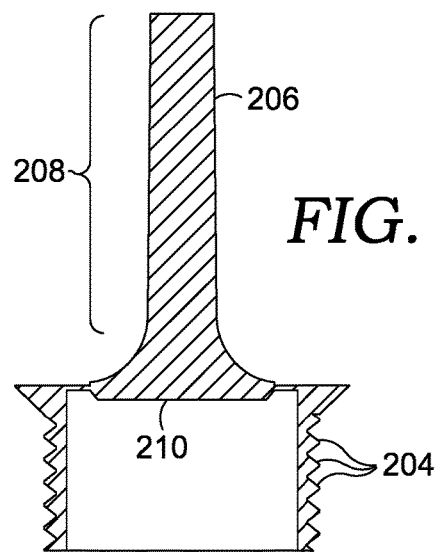
FIG. 6 is a cross section view taken through the cap of FIG. 5 in accordance with an embodiment of the present invention.

The cap 200 of FIGS. 4-6 is preferably secured to the fluid-containing device through a plurality of threads 204 positioned on an outer diameter of the attachment means 202. Such an attachment configuration is possible where the cap has a cylindrical cross sectional shape. The plurality of threads 204 engage a corresponding threaded opening of the fluid-containing device.

The cap 200 also comprises a tip portion 206 that extends from the attachment means 202 and has a tip length 208. The tip portion 206 extends a sufficient length 208 so as to provide a portion of the tip length 208 which is breakable. The tip length 208 is preferably solid and includes a blocking plate 210 for closing against an opening of a fluid-containing device. Upon a breaking of the tip length 208, the tip length and blocking plate are generally removed from the opening of the fluid-containing device in a way that fluid from within the fluid-containing device exits into the chemically-inflatable bag and mixes with a reacting agent contained in the chemically-inflatable bag. The cap 200 can be fabricated from a variety of materials, but due to the nature of the fluid in the fluid-containing device, it is preferred that the cap 200 is fabricated from a plastic material.

Figure 7:
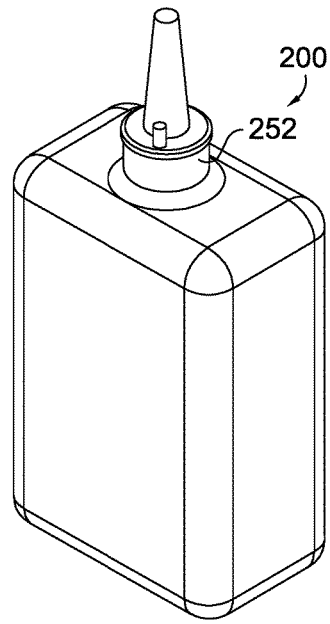
FIG. 7 is a perspective view of a fluid-containing device incorporating the cap of FIGS. 4-6 in accordance with an embodiment of the present invention.
Figure 8:
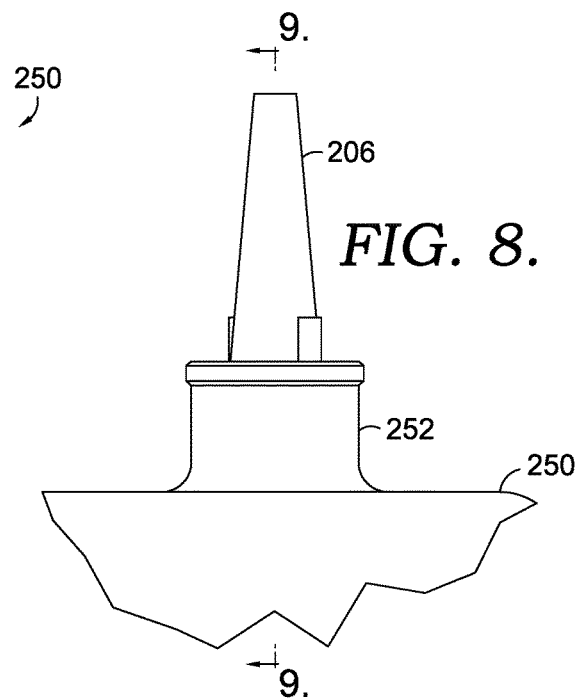
FIG. 8 is a side elevation view of a portion of the fluid-containing device of FIG. 7 in accordance with an embodiment of the present invention.
Figure 9:
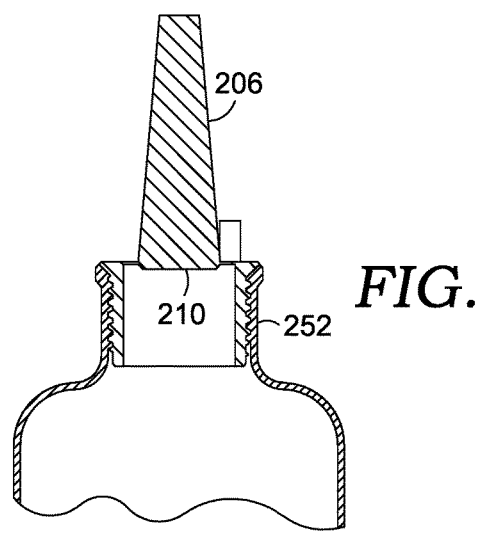
FIG. 9 is a cross section view of a portion of the fluid-containing device of FIG. 8 in accordance with an embodiment of the present invention.

Referring now to FIGS. 7-9, an embodiment of the present invention depicts the fluid-containing device of the present invention. More specifically, FIG. 7 depicts a fluid containing device 250 having a cap 200 attached, as previously discussed. As shown in FIGS. 8 and 9, the cap 200 is secured to the fluid-containing device 250 such that the blocking plate 210 and tip portion 206 prevent the fluid from exiting the fluid-containing device 250.

The fluid-containing device 250 can take on a variety of shapes and sizes. One such configuration is shown in FIG. 7 and is a bottle-like design having an opening 252 in which the attachment means 202 of the cap 200 is secured. Other forms of the fluid-containing device 250 can include a soft-sided container such as a bag or other types of a hard-sided container. While the fluid-containing device can contain any type of fluid, as discussed above, it is preferred that the fluid-containing device 250 contains an acid. One such example of an acid is vinegar.

Figure 10:
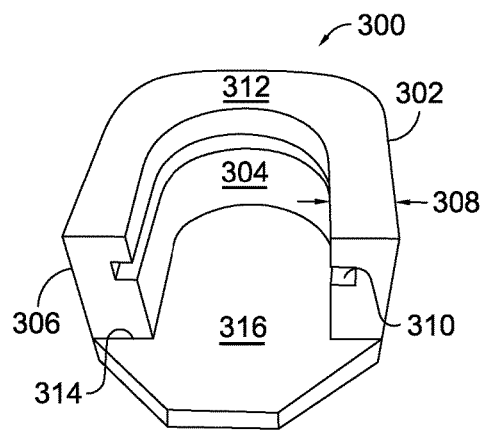
FIG. 10 is a perspective view of a cap for a fluid-containing device in accordance with an alternate embodiment of the present invention.
Figure 11:
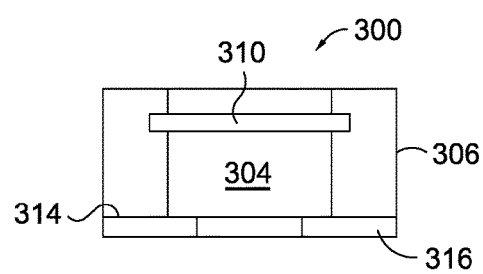
FIG. 11 is an elevation view of the cap for a fluid-containing device in accordance with an alternate embodiment of the present invention.
Figure 12:
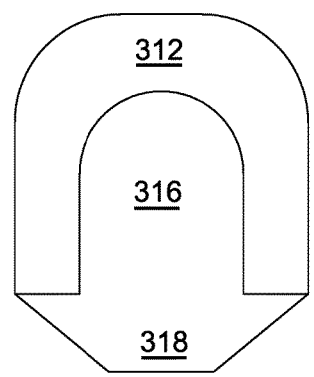
FIG. 12 is a top view of the cap for a fluid-containing device in accordance with an alternate embodiment of the present invention.

An alternate embodiment of the cap of the present invention for sealing an opening in a fluid-containing device of a chemically-inflatable bag is shown in FIGS. 10-13. The removable cap 300 comprises a generally collar-shaped member 302 having an inner wall 304 and an opposing outer wall 306. As such, the generally collar-shaped member 302 has a collar thickness 308. For the embodiment shown in FIGS. 10-13, the generally collar-shaped member 302 is U-shaped. However, it is envisioned that alternate shapes for the collar-shaped member can be used. As shown in FIGS. 10 and 11, the generally collar-shaped member 302 also comprises a recessed slot 310 formed along the inner wall 304 and extending a distance into the thickness 308 of the generally collar-shaped member 302. This recessed slot 310 is used in securing the removable cap 300 to a fluid-containing device, as will be discussed further below.

Figure 13:
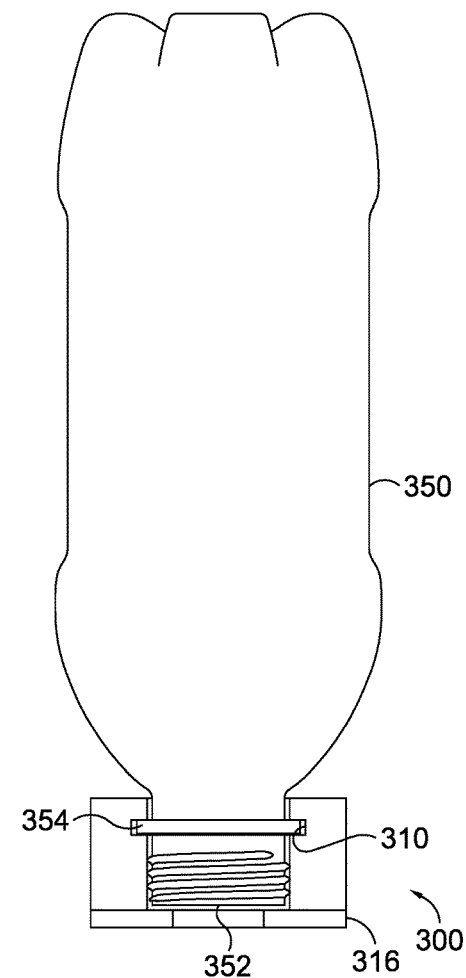
FIG. 13 is an elevation view of a fluid-containing device incorporating the cap of FIGS. 10-12 in accordance with an alternate embodiment of the present invention.

The generally collar-shaped member 302 also has a first face 312 and an opposing second face 314 with a backplate 316 being secured to the second face 314. The backplate 316 provides a surface of the removable cap 300 for capping off or sealing an adjacent fluid-containing device. The backplate 316 also comprises a lip 318 that extends in a direction beyond the inner and outer walls, 304 and 306, respectively, of the generally collar-shaped member 302. The lip 318 and its function will be discussed in more detail below. More specifically, as shown in FIG. 13, the removable cap 300 is positioned about a fluid-containing device 350 having an opening 352 such that the recessed slot 310 is sized to slidably engage the fluid-containing device 350. For the embodiment shown in FIG. 13, a collar 354 slides into and out of the recessed slot 310. As such, when the collar 354 is placed within the recessed slot 310, the backplate 316 of the generally collar-shaped member 302 is positioned against the opening 352 of the fluid-containing device 350 preventing any fluid within the fluid-containing device 350 from exiting. As with the previous embodiments discussed above, the fluid-containing device 350 is not limited to a bottle-shape as disclosed in FIG. 13, but could include other devices, including but not limited to, a plastic bag. As with other embodiments of the present invention, the removable cap 300 can be fabricated from a variety of materials, but is preferably fabricated from a plastic material.

For the embodiment depicted in FIGS. 10-13, the removable cap 300 is used to seal a liquid in the fluid-containing device 350 until it is needed to help inflate the chemically-inflatable bag. More specifically, the recessed slot 310 of the generally collar-shaped member 302 engages a corresponding collar 354 of the fluid-containing device 350 such that the backplate 316 covers the opening 352 of the fluid-containing device 350. With the removable cap 300 having a generally collar-shaped configuration, the cap 300 can be removed from the fluid-containing device 350 by application of a force to the lip 318 of the backplate 316 and/or to the open side of the generally collar-shaped member 302, such that the recessed slot 310 slides relative to the collar 354, thereby removing the backplate 316 from covering the opening 352.

Figure 17:
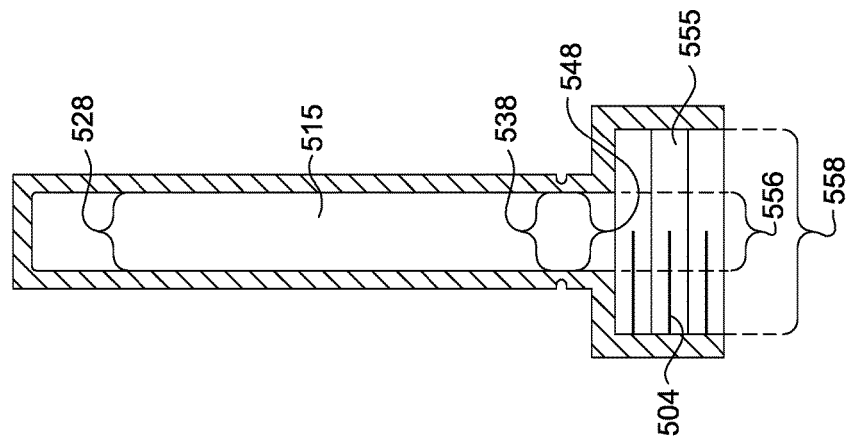
FIG. 17 is a cross section view taken through the cap of FIG. 16 in accordance with an embodiment of the present invention.
Figure 16:
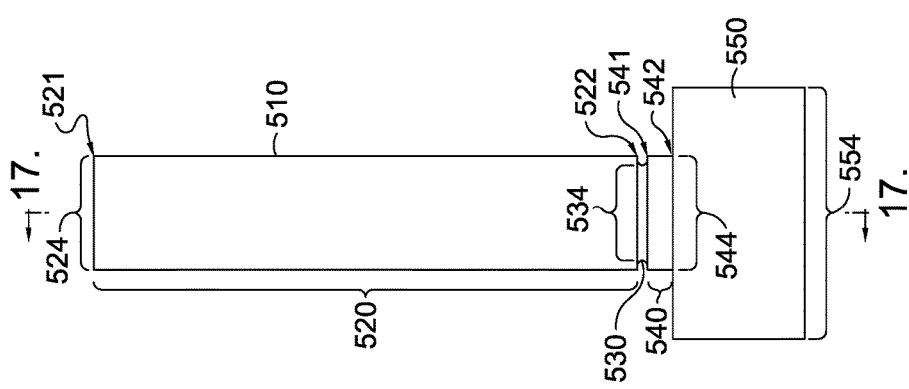
FIG. 16 is a side elevation view of the cap of FIG. 15 in accordance with an embodiment of the present invention.
Figure 15:
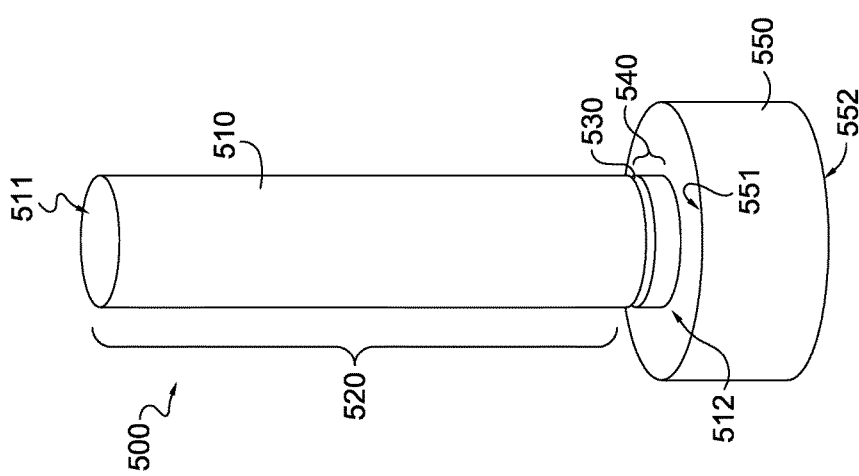
FIG. 15 is a perspective view of a cap for a fluid-containing device in accordance with an embodiment of the present invention.

An alternate embodiment of the cap of the present invention for sealing an opening in a fluid-containing device contained within a chemically-inflatable bag is shown in FIGS. 15-17. A cap 500 of FIGS. 15-17 may be secured and removably attached to a fluid-containing device. In exemplary aspects, the cap 500 may be configured to seal an opening of a fluid-containing device upon attachment thereto, and while attached with the fluid-containing device and sealing the opening, the cap 500 may further be configured to unseal or expose the opening of the fluid-containing device upon removal of at least a portion of the cap 500. Such aspects of the cap 500 contemplate an attachment means, like that of the cap 200, for securing the cap 500 to the fluid-containing device, and also contemplate a removable portion.

Accordingly, the cap 500 of FIGS. 15-17 may comprise a plurality of threads 504 positioned on an inner portion of the cap 500 that secure and removably attach the cap 500 to a fluid-containing device (not depicted in FIGS. 15-17) proximate an opening. Such an attachment configuration is possible where the cap 500 has a cylindrical cross sectional shape, in which the plurality of threads 504 may engage a corresponding threaded opening of a fluid-containing device.

As can be seen in FIG. 15, the cap 500 may comprise a cap tip 510 and a cap base 550 that are connected. Generally, the cap base 550 may be positioned inferior to the cap tip 510 to form a lower portion of the cap 500, and the cap tip 510 may form an upper portion of the cap 500 and extend from the cap base 550 in an outward direction from a fluid-containing device. Further, both the cap tip 510 and the cap base 550 may have a cylindrical cross sectional shape, and in some aspects, the cap tip 510 may have a smaller diameter than the cap base 550. More detailed aspects related to the structural relationship between the cap tip 510 and the cap base 550 are more easily described after discussing their individual aspects and components. Thus, these individual aspects and components will now be discussed, and a more detailed discussion of aspects related to structural relationship between the cap tip 510 and the cap base 550 will follow.

Beginning with the cap tip 510 and with reference to FIGS. 15-17, the cap tip 510 may extend between a first cap tip end 511 and a second cap tip end 512 positioned opposite one another. The cap tip 510 may extend in a linear manner between the first and second cap tip ends 511, 512 such that the cap tip 510 may be oriented along an axis, and thus, during use, the cap tip 510 may extend vertically and be in alignment with a vertical axis. As mentioned, the cap tip 510 may have a cylindrical cross sectional shape, and it is contemplated that a shape and structure of the cap tip 510 may depend on respective features of individual components included in the cap tip 510. In one example, the cap tip 510 may have a different width, diameter, or thickness at different portions, which may provide more or less structural integrity at a selected portion.

In the embodiment of the cap 500 depicted in FIGS. 15-17, the cap tip 510 may comprise an elongated tip portion 520, a recessed tip portion 530, and a base tip portion 540, all of which may collectively form an overall structure of the cap tip 510. These components may have an orientation similar to that of an entirety of the cap 500 and thus, may be aligned along an axis. Moreover, the cap tip 510 may be configured such that these components are arranged top-to-bottom in the following order: the elongated tip portion 520, the recessed tip portion 530, and the base tip portion 540. As such, the elongated tip portion 520 may be positioned nearest the first cap tip end 511, the base tip portion 540 may be positioned nearest the second cap tip end 512, and the recessed tip portion 530 may be positioned therebetween. FIGS. 15-17 further illustrate these aspects, and as shown, the elongated tip portion 520 extends between the recessed tip portion 530 and the first cap tip end 511, and the base tip portion 540 extends between the recessed tip portion 530 and the second cap tip end 512.

In further aspects, the elongated tip portion 520 and the base tip portion 540 may each include a first end, a second end, and a width. The respective first and second ends of the elongated tip portion 520 and the base tip portion 540 may be opposite one another, and the width may be a distance that the elongated tip portion 520 and the base tip portion 540 extend in a lateral direction. In certain aspects, the width may be a diameter of the elongated tip portion 520 and the base tip portion 540. Accordingly, the elongated tip portion 520 may comprise a first elongated tip portion end 521, a second elongated tip portion end 522, and an elongated tip portion width 524. In a likewise manner, the base tip portion 540 may comprise a first base tip portion end 541, a second base tip portion end 542, and a base tip portion width 544. In additional aspects, the recessed tip portion 530 may have similar features including a first end, a second end, and a recessed tip portion minimum width 534, which may be a least amount of distance that the recessed tip portion 530 extends in a lateral direction or may also be a minimum diameter of the recessed tip portion 530.

An exemplary arrangement of the elongated tip portion 520, the recessed tip portion 530, and the base tip portion 540 is depicted in FIG. 16. In this embodiment of the cap 500, the base tip portion 540 is positioned nearest to the cap base 550, and the second base tip portion end 542 may be adjacent to an end of the cap base 550. Positioned more distally from the cap base 550 than the base tip portion 540 is the recessed tip portion 530. At one end, the recessed tip portion 530 is adjacent to the first base tip portion end 541, and at an opposite end, the recessed tip portion 530 is adjacent to the elongated tip portion 520. Stated differently, the base tip portion 540 is adjacent to the recessed tip portion 530 proximate the first base tip portion end 541, and the elongated tip portion 520 is adjacent to the recessed tip portion 530 proximate the second elongated tip portion end 522.

Staying with FIG. 16, this embodiment further contemplates that the recessed tip portion minimum width 534 is less than the base tip portion width 544 at the first base tip portion end 541 and is less than the elongated tip portion width 524 at the second elongated tip portion end 522. In additional aspects, it is contemplated that the elongated tip portion width 524 and the base tip portion width 544 may be constant as the elongated tip portion 520 and the base tip portion 540 extend between their respective ends. In such aspects, it is further contemplated that the elongated tip portion 520 and the base tip portion 540 may be a similar shape and width, and thus, the elongated tip portion width 524 and the base tip portion width 544 may be substantially equal.

Although not depicted, aspects herein contemplate an elongated tip portion width and a base tip portion width that may vary as the elongated tip portion and the base tip portion extend between their ends. In one such aspect, the elongated tip portion may be configured to distally taper and thus, an elongated tip portion width will gradually decrease as the elongated tip portion approaches the first elongated tip portion end. Additionally, it is contemplated that an elongated tip portion width, a recessed tip portion minimum width, and a base tip portion width may vary based on a respective shape of each portion.

In exemplary aspects, the cap tip 510 may be configured to break and to permit a flow of liquid through the cap 500 in order to exit a fluid-containing device. Such aspects involve structural features of components of the cap tip 510, and it is contemplated that the cap tip 510 may be hollow throughout and include an internal chamber defined by an inner diameter of the cap tip 510. Such aspects of the cap tip 510 may be included in each portion be included in each portion of the cap tip 510 and may vary accordingly.

As best shown in FIG. 17, the cap tip 510 may include an a cap tip internal chamber 515 extending between the first and second cap tip ends 511, 512 and as such, the elongated tip portion 520, the recessed tip portion 530, and the base tip portion 540 may be hollow throughout. Additionally, the cap tip internal chamber 515 may be in communication with an internal portion of the cap base 550 at the second cap tip end 512 or the second base tip portion end 542. Moreover, an inner diameter of each portion of the cap tip 510 may define the cap tip internal chamber 515, and as such, the base tip portion 540 may have a base tip portion inner diameter 548 that defines the cap tip internal chamber 515 between the first and second base tip portion ends 541, 542. In a similar manner, the recessed tip portion 530 may have a recessed tip portion inner diameter 538, and the elongated tip portion 520 may have an elongated tip portion inner diameter 528. Further, the recessed tip portion inner diameter 538 and the elongated tip portion inner diameter 528 define a portion of the cap tip internal chamber 515 that extends through the recessed tip portion 530 and the elongated tip portion 520.

Additionally, as shown in the example of FIG. 17, the inner diameters 528, 538, 548 may be a same size. In some aspects, the inner diameters 528, 538, 548 may be configured to correspond to a size of an opening of a fluid containing device or may be configured to have a size that permits flow of a liquid at a desired rate. It is further contemplated that the inner diameters 528, 538, 548 may be a larger or smaller than one other such that each of the inner diameters 528, 538, 548 has a different size.

In further aspects, the cap tip internal chamber 515 may present a cap tip opening upon removal of a portion of the cap tip 510. After removal of a portion of the cap tip 510, the cap tip opening may be included in a remaining portion of the cap tip 510 and may be presented at a position most distal to the cap base 550. Accordingly, the cap tip opening may have a cap tip opening diameter corresponding to a diameter of the cap tip 510 at a location where a portion of the cap tip was removed. In an exemplary aspect, a portion of the cap tip 510 may be removed at the first base tip portion end 541, and therefore, the cap tip opening may be presented at the first base tip portion end 541 and may be defined by the base tip portion inner diameter 548.

Even though FIGS. 15-17 depict the cap tip 510 as hollow throughout, aspects herein contemplate that the cap tip 510 may be solid at one portion and hollow at another. For example, the elongated tip portion 520 may be solid throughout and the recessed tip portion 530 and the base tip portion 540 may be hollow like the example depicted in FIGS. 15-17. Moreover, it is also contemplated that a portion of the elongated tip portion 520 and a portion of the recessed tip portion 530 may be solid at one portion and may be hollow at another, different portion. Further, the elongated tip portion 520, the recessed tip portion 530, and the base tip portion 540 may also be less hollow than depicted in FIGS. 15-17.

In even further aspects, the recessed tip portion minimum width 534 and the recessed tip portion inner diameter 538 may be configured to cause the cap tip 510 to be breakable at the recessed tip portion 530. Additionally, the elongated tip portion 520 may have a sufficient width, may extend a sufficient length, and may be partially solid so as to resist a greater amount of force applied to the cap tip 510 than the recessed tip portion 530. Comparatively, the base tip portion 540 may also have a sufficient width and/or may extend a sufficient length so as to be capable of resisting a greater amount of force applied to the cap tip 510 than the recessed tip portion 530. Consequently, structural differences among the elongated tip portion 520, the recessed tip portion 530, and the base tip portion 540 may cause the cap tip 510 to break at the recessed tip portion 530 upon an application of force.

Turning now to the cap base 550 and with continued reference to FIGS. 15-17, the cap base 550 may extend between a first cap base end 551 and a second cap base end 552, which are positioned opposite one another. Like the cap tip 510, the cap base 550 also extends between the first and second cap base ends 551, 552 in a liner manner such that the cap base 550 may be oriented and aligned along an axis. Additionally, when the cap 500 is used with a fluid-containing device, the cap base 550 may also extend vertically causing the cap base 550 to be in alignment with a vertical axis. Moreover, the cap base 550 may have a cylindrical cross sectional shape, and the cap base 550 may further comprise a cap base width 554, which, like the widths discussed above, may be a distance that the cap base 550 extends in a lateral direction.

In exemplary aspects, the cap base 550 may be configured to directly and removably attach to an opening of a fluid-containing device and may further be configured such that a fluid may flow through an internal chamber of the cap base 550. As shown in FIG. 17, the cap base 550 may be a hollow structure and may include a cap base internal chamber 555 that may be defined by a cap base inner diameter 558. Moreover, the cap base 550 may include a cap base opening 556 at the first cap base end 551. The cap base internal chamber 555 may be in communication with the cap tip internal chamber 515 and an internal portion of a fluid-containing device. In other aspects, the cap base 550 may provide an attachment configuration for removably securing the cap 500 to a fluid-containing device, while also permitting a liquid to flow through the cap base 550 and exit a fluid-containing device. As such, the cap base 550 may further comprise the plurality of threads 504 positioned on an inner surface of the cap base internal chamber 555, and the plurality of threads 504 may engage a corresponding threaded opening of a fluid-containing device.

As will be evident hereinafter, it is contemplated that the foregoing aspects of the cap tip 510 and the cap base 550 may be configured and used with a fluid-containing device in a manner like that of the cap 200 or the cap 300. The embodiment depicted in FIGS. 15-17 illustrates an exemplary configuration of the cap 500 that may be removably attached to a fluid-containing device contained within a chemically inflatable bag to seal an opening of the fluid-containing device upon attachment and to later unseal the opening upon a breaking of the cap 500. In such aspects, the cap tip 510 and the cap base 550 have a similar cylindrical cross sectional shape, but the cap tip 510 may have a smaller width and a greater length than the cap base 550. The cap tip 510 and the cap base 550 are joined and contingent at the second cap tip end 512 and the first cap base end 551, and the base tip portion 540 of the cap tip 510 is adjacent to the cap base 550 at the second base tip portion end 542 and the first cap base end 551. The base tip portion width 544 is less than the cap base width 554. As the cap tip 510 extends outwardly from the cap base 550, the base tip portion 540 is adjacent to an end of the recessed tip portion 530 at the first base tip portion end 541, and at an opposite end of the recessed tip portion 530, the elongated tip portion 520 is adjacent to the recessed tip portion 530 at the second elongated tip portion end 522.

In addition, the cap tip internal chamber 515 and the cap base internal chamber 555 are in communication, and therefore, allow a liquid to flow through the cap 500 when a portion of the cap tip 510 is removed from the cap 500. Accordingly, upon a breaking of the cap tip 510, a portion of the cap 500 is removed to present a cap tip opening. As such, the cap 500 is generally removed from an opening of the fluid-containing device or exposes an opening of the fluid-containing device in a way that permits fluid from within the fluid-containing device to exit into the chemically-inflatable bag and mix with a reacting agent contained in the chemically-inflatable bag. The cap 500 can be fabricated from a variety of materials that are compatible for use with fluids contained in the fluid-containing device, such as a plastic material.

Referring now to FIGS. 18-20, an embodiment of the present invention depicts the fluid-containing device of the present invention. More specifically, FIG. 18, depicts a fluid-containing device 560 having a cap 500 attached, as previously discussed. As shown in FIGS. 19 and 20, the cap 500 is secured to the fluid-containing device 560 such that the cap tip 510 prevents the fluid from exiting the fluid-containing device 560.

The fluid-containing device 560 can take on a variety of shapes and sizes. One such configuration is shown in FIG. 18 and is a bottle-like design having an opening 562 in which the cap base 550 of the cap 500 is secured. Other forms of the fluid-containing device 560 can include a soft-sided container such as a bag or other types of hard-sided containers. While the fluid-containing device can contain any type of fluid, as discussed above, it is preferred that the fluid-containing device 560 contains an acid. One such example of an acid is vinegar.

Although not depicted, it is contemplated herein that the cap 500 may not include the cap base 550 and as such, a cap may only include the cap tip 510. As such, the cap may be attached to a fluid-containing device at the base tip portion. In some aspects, the cap may be fabricated with the fluid-containing device, and in other aspects, the cap may be attached to the fluid-containing device by an adhesive, welding, and other means known in the art.

Figure 14:
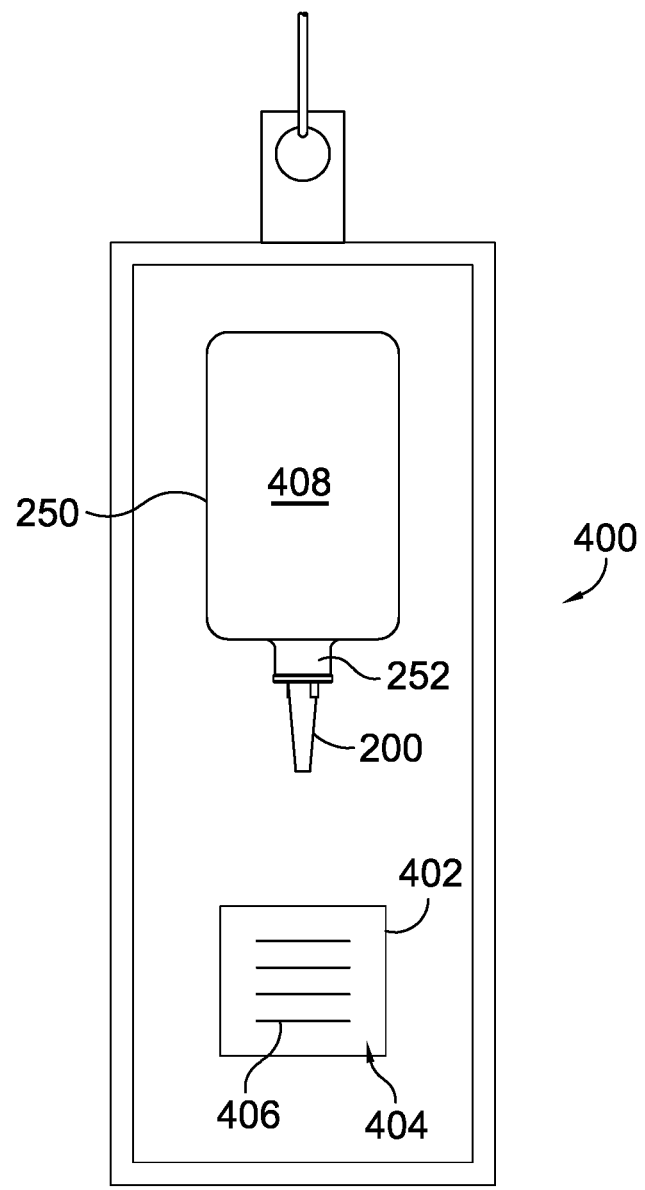
FIG. 14 is an elevation view of a chemically-inflatable bag in accordance with an embodiment of the present invention.

Referring now to FIG. 14, a chemically-inflatable bag 400 for use as a type of plug is depicted. As discussed above, in operation, the chemically-inflatable bag initially contains two separate and discrete reactants. The chemically-inflatable bag 400 comprises a first reacting agent 404, which can be a solid/powder comprising sodium bicarbonate. The first reacting agent 404 can be placed directly in the chemically-inflatable bag 400, it can be located in a water soluble bag 402, or both. The water soluble bag 402 can also comprise a plurality of openings 406, such as slits for accessing the first reacting agent 404 within the water soluble bag 402. Additional solid/powder of the first reacting agent 404 is placed loose within the chemically-inflatable bag 400 in order to help initiate the chemical reaction and to help ensure a complete reaction.

The first and second reacting agents placed within the chemically-inflatable bag are premeasured to ensure that the proper amount of reactants are being used. The premeasured amount may be based on the type of reactants being used, the concentration of the reactants, or any other attributes or characteristics of the reactants that influence the behavior of the chemical reaction therebetween.

The chemically-inflatable bag 400 also comprises a fluid-containing device, as discussed above. For explanatory purposes, the chemically-inflatable bag 400 utilizes the fluid-containing device 250 of FIGS. 7-9, but could also utilize other fluid-containing devices and removable caps as discussed herein. That is, the fluid-containing device 250 has an opening 252 and a removable cap 200, as previously discussed, but could also use removable cap 300, cap 500 or the fluid-containing device 560. The fluid-containing device 250 has a second reacting agent 408 therein, where the second reacting agent 408 is preferably an acid, such as vinegar.

Initially, the chemically-inflatable bag is in a collapsed condition and may even be in a folded state. When in an appropriate position, such as proximate a cavity formed in the ground that is to be sealed, the bag is unfurled or prepared to be dropped into the opening to be sealed. This sealing does not occur until the bag inflates through a chemical reaction.

As discussed above, the caps 200, 500 are removable. Upon application of a force to the cap 200, a portion of the cap is removed or broken off of the opening 252 of the fluid-containing device 250 such that fluid (the second reacting agent) is permitted to flow through the opening 252 and contact the first reacting agent 404 and/or the water soluble bag 402. In a similar manner, upon application of a force to the cap 500, a portion of the cap 500 is removed or broken off and the opening 562 of the fluid-containing device 560 such that fluid (the second reacting agent) is permitted to flow through the opening 562 and contact the first reacting agent 404 and/or the water soluble bag 402. Further, the cap 500 may be configured such that upon an application of force to the cap 500, the cap tip 510 may break at the recessed tip portion 530 causing the elongated tip portion 520 and all or part of the recessed tip portion 530 to be removed from the opening 562 of the fluid-containing device 560 in a manner like that described above. Additionally, in aspects where the cap 500 does not include the cap base 550, the cap may be configured to break in this same manner.

The acid of the second reacting agent permeates the water soluble bag 402 as well as enters through the openings 406 in the water soluble bag 402. The permeation and dissolution of the water-soluble bag 402 generally takes approximately 30 seconds, providing an operator with sufficient time to place the chemically-inflatable bag in the desired location prior to the bag inflating.

Sufficient force can be applied to the cap 200 or the cap 500 from outside the folded or unfolded, but sealed, chemically-inflatable bag. When the second reacting agent 408 contacts the first reacting agent 404, a chemical reaction occurs, the by-product of which is carbon dioxide. The carbon dioxide expands the chemically-inflatable bag 400 from a collapsed condition to an inflate condition. In the inflated condition, the chemically-inflatable bag 400 plugs the borehole and/or obstructs foreign items from entering a formed cavity.

The removable cap can be fabricated from a variety of materials given the necessary operating conditions for the removable cap and chemically-inflatable bag. That is, since the liquid present in the fluid-containing device is preferably an acid, the cap material must be able withstand the acidic conditions for extended periods of time. Furthermore, depending on the physical design of the removable cap, it is necessary that the removable cap be fabricated from a material that can be broken by a user such that it is removable from the fluid-containing device upon application of a force. Generally, a plastic material will meet these requirements and is therefore preferable.

In other aspects, the removable cap, the fluid-containing device, and their respective components may be sized in order to accommodate for operating conditions and certain features. As some embodiments contemplate removal of the cap upon an application of force, the cap may be sized to include a portion that may be broken to present an opening that permits a desired rate of flow of a fluid contained within the fluid-containing device. Generally, the removable cap and respective components thereof, may be sized in manner that corresponds to the fluid-containing device.

The material(s) chosen for construction of the chemically-inflatable bag are generally sufficiently stable so as to be gas impermeable for an extended length of time consistent with the typical operation of the chemically-inflatable bag (i.e., remaining at a fully inflated volume until the blocked hole is accessed). Such materials generally include nylon or those with nylon attributes. Alternatively, since the byproduct of the chemical reaction occurring within the chemically-inflatable bag is $CO_2$, other materials that are $CO_2$ barriers may also be used within the chemically-inflatable bag. However, it should be understood that any suitable material may be used.

In embodiments of the present invention, the chemically-inflatable bag 400 can be assembled with varied reacting agents. The first reacting agent 404 may be sodium bicarbonate powder, which is placed in the water soluble bag 402 and sealed, or is placed directly in the chemically-inflatable bag 400. Next, the second reacting agent 408 may be technical grade acid that is diluted with water to 16% v/v, which is poured into the first section fluid-containing device 250, 560 and sealed by removable cap 200, 500. Accordingly, the sodium bicarbonate and the acid are secured at the opposite ends of the chemically-inflatable bag 400.

By way of example, the chemically-inflatable bag 400, when expanded, may have an outer circumference within the range of 18 to 24 inches in diameter and a length of up to 6 feet. However it should be understood that virtually any diameter and any length of the chemically-inflatable bag 400 could be used. Further, the chemically-inflatable bag 200 may be shaped and sized in any manner when expanded (e.g., cube, sphere, and the like) to accommodate the shape and size of the destination-formed cavity, and is not limited to a cylinder.

In other embodiments, the chemically-inflatable bag 400 is substantially gas-tight and is of a shape such that it can be placed into a formed cavity upon completion of expansion to the inflated condition. Or, the chemically-inflatable bag 400 may be configured in size and shape such that its outer surface does not fully inflate and fully expand to an inner circumference of the formed cavity until the chemical reaction is exhausted and the chemically-inflatable bag 400 is just reaching a full inflation.

The description above depicts examples of various chemically-inflatable bags 400 and removable caps for the fluid-containing device within the chemically-inflatable bag. These examples are not meant in any way to limit the scope of this invention. Further, while not meant to be limiting, the chemically-inflatable bag 400 may be deployed in any environment and, once deployed, may withstand environmental factors for a duration of time that is greater than a maximum lag time between drilling a hole in a construction setting and installing an item in the hole for which it was drilled.

From the foregoing, it will be seen that this invention is one well-adapted to attain all the ends and objects herein above set forth together with other advantages which are obvious and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The invention claimed is:

1. A cap for sealing an opening of a fluid-containing device of a chemically-inflatable bag comprising:

a cap base, the cap base being directly and removably attached to the fluid-containing device proximate the opening, said cap base having a cap base width and a first cap base end;

a cap tip connected to and extending from the cap base in an outward direction from the fluid-containing device, said cap tip comprising:

(1) an elongated tip portion having a first elongated tip portion end, a second elongated tip portion end, and an elongated tip portion width being constant between the first and second elongated tip portion ends;

(2) a base tip portion having a first base tip portion end, a second base tip portion end, and a base tip portion width being constant between the first base tip portion end and the second base tip portion end, said base tip portion width being less than the cap base width, said base tip portion being positioned adjacent to the cap base at the second base tip portion end, and (3) a recessed tip portion being positioned between the elongated tip portion and the base tip portion and adjacent to the first base tip portion end and the second elongated tip portion end, said recessed tip portion having a recessed tip portion minimum width being less than the elongated tip portion width and less than the base tip portion width, wherein breaking the cap tip at the recessed tip portion causes substantially all of the elongated tip portion to be removed from the cap tip and exposes the opening of the fluid-containing device, and wherein upon the breaking fluid from within the fluid-containing device exits into the chemically-inflatable bag and mixes with a reacting agent contained in the chemically-inflatable bag in order to inflate the chemically-inflatable bag.

2. The cap of claim 1, wherein the cap has a cylindrical cross sectional shape.

3. The cap of claim 2, wherein the cap base further comprises a plurality of threads positioned on an inner surface of the cap base.

4. The cap of claim 3, wherein the elongated tip portion width and the base tip portion width are equal.

5. The cap of claim 1, wherein the fluid in the fluid-containing device is an acid.

6. The cap of claim 1, wherein the cap tip further comprises a cap tip internal chamber extending from the second base tip portion end in the outward direction from the fluid-containing device and terminating proximate the recessed tip portion.

7. The cap of claim 1, wherein the elongated tip portion width is constant.

8. A chemically-inflatable bag for a borehole plug comprising:

a first reacting agent; and a fluid-containing device positioned within the chemically-inflatable bag, the fluid-containing device having an opening, a removable cap being directly and removably secured to the fluid-containing device, and a fluid contained therein, said removable cap comprising:

a cap base having a constant width; and a cap tip extending from the cap base in an outward direction from the fluid-containing device, said cap tip comprising an elongated tip portion having a first elongated tip portion end, a second elongated tip portion end, and an elongated tip portion width being constant between the first and second elongated tip portion ends, a base tip portion having a first base tip portion end, a second base tip portion end, and a base tip portion width, and a recessed tip portion being positioned between the second elongated tip portion end and the first base tip portion end and having a recessed tip portion width, said base tip portion width being less than the cap base width, said recessed tip portion width being less than the base tip portion width, wherein the cap tip extends from the second base tip portion end to the first elongated tip portion end, wherein removing the removable cap from the fluid-containing device exposes the opening of the fluid containing device and causes the fluid to exit into the chemically-inflatable bag and mix with the first reacting agent in order to inflate the chemically-inflatable bag.

9. The chemically-inflatable bag of claim 8, wherein the first reacting agent is in a water soluble bag positioned within the chemically-inflatable bag.

10. The chemically-inflatable bag of claim 9, wherein the water soluble bag further comprises a plurality of openings.

11. The chemically-inflatable bag of claim 8, wherein the first reacting agent in the water soluble bag is sodium bicarbonate.

12. The chemically-inflatable bag of claim 8, wherein the second reacting agent in the fluid-containing device is an acid.

13. The chemically-inflatable bag of claim 8, wherein the cap base is directly and removably attached to the fluid-containing device proximate the opening, wherein the cap tip is solid at the elongated tip portion and hollow at the base tip portion.

* * * * *